Jan. 13, 1959   F. B. BERGER ET AL   2,869,117
COURSE AND SPEED INDICATING SYSTEM
Filed Sept. 18, 1948   6 Sheets-Sheet 1

FRANCE B. BERGER
WILLIAM J. TULL
INVENTOR

BY
ATTORNEY

FRANCE B. BERGER
WILLIAM J. TULL
INVENTOR

FRANCE B. BERGER
WILLIAM J. TULL
INVENTOR

Jan. 13, 1959  F. B. BERGER ET AL  2,869,117
COURSE AND SPEED INDICATING SYSTEM
Filed Sept. 18, 1948  6 Sheets-Sheet 5

INVENTOR
FRANCE B. BERGER
WILLIAM J. TULL
BY
ATTORNEY

Jan. 13, 1959  F. B. BERGER ET AL  2,869,117
COURSE AND SPEED INDICATING SYSTEM
Filed Sept. 18, 1948  6 Sheets-Sheet 6

FRANCE B. BERGER
WILLIAM J. TULL
INVENTOR

BY *A.H. Mackey*
ATTORNEY

United States Patent Office 2,869,117
Patented Jan. 13, 1959

2,869,117

COURSE AND SPEED INDICATING SYSTEM

France B. Berger and William J. Tull, Pleasantville, N. Y., assignors to General Precision Laboratory Incorporated, a corporation of New York Application September 18, 1948, Serial No. 49,926

21 Claims. (Cl. 343—9)

This invention relates to a navigation system for determining the ground speed and drift of a vehicle with respect to the earth over which it is traveling and while the invention is particularly applicable to the navigation of aircraft, the principles involved are by no means limited thereto but are equally applicable to other modes of vehicular travel such as navigation by ship and the like.

More specifically the invention has for its purpose the provision of an efficient and accurate system utilizing the phenomenon known as the Doppler effect for determining the actual direction of motion of a craft moving over the earth's surface and the ground speed of the craft or its speed in the direction of its motion.

As is well known, the Doppler effect is the change in frequency undergone by a wave transmitted between two relatively moving bodies and if a wave is transmitted from a moving body in a line coinciding with the velocity vector of the body to a second stationary body reflected thereby and received again at the first body the amount of shift in frequency may be expressed by the formula $$\Delta f = \frac{2fV}{C} \quad (1)$$

where $\Delta f$ is the change in frequency known as the Doppler shift in frequency, $f$ the frequency of the wave transmitted, $V$ the velocity of the moving body and $C$ the velocity of the waves transmitted in the media through which they are forced to travel, in the case of electromagnetic waves approximately 300,000,000 meters per second. The formula given above, however, only holds true so long as the waves are transmitted and received in a direction coinciding with the velocity vector which is desired to be determined. In the case of an airplane for example, the waves could not ordinarily be projected directly in the line of motion of the airplane, else they would never reach the earth's surface to be reflected thereby. Rather it is necessary that the waves be directed downwardly at an angle as respects the velocity vector and the formula given above must be corrected by a factor corresponding to the cosine of the angle of transmission as respects the direction of the velocity vector, becoming, $$\Delta f = \frac{2fV}{C} \cos \theta$$

where $\theta$ is the angle of the direction of the waves as respects the direction of the velocity vector to be determined and the other factors are the same as before. If the waves be thought of as directed along a single line and this line or pencil of waves be rotated at a constant angle $\theta$ about the velocity vector it will be apparent that a cone having an apex angle of $2\theta$ will be generated and the intersection of the cone with the earth's surface which may be considered as a plane surface for present considerations will be a hyperbola. A change in the angle $\theta$ will produce a new cone and a new hyperbola of intersection but since $\theta$ has been changed, will also produce a new Doppler frequency shift. It is apparent, therefore, that considering different points on the earth's surface as reflecting points, those points which will give a return of the same Doppler frequency shift may be connected by lines of constant frequency which contour lines constitute a family of hyperbolas whose X and Y axes coincide, the origin being directly beneath the airplane and the X axis being the direction of travel of the airplane.

The instant invention utilizes this phenomenon to obtain reflected signals from a considerable area of the earth's surface so that an appreciable amount of energy is received and measured and at the same time the energy transmitted and received is so distributed over the earth's surface as to follow closely the pattern of constant frequency contours so that a relatively narrow and more easily measured band of Doppler shifted frequencies is received.

Additionally the present invention provides a system whereby any departure of the area from which the signals are received, also herein termed "illuminated area," from the area closely coinciding with the contours of constant frequency, is utilized to reorient the areas and at the same time indicate the drift angle of the aircraft, i. e., the angle between the heading of the craft and its true direction of travel due to wind and the like.

Specifically these purposes are obtained by the use of a special antenna system combined with a unique system for measuring and evaluating the frequency of the reflected signals so that the antenna system is oriented about the ground track regardless of the craft heading and the frequency of returned signals are more easily interpreted as a measure of vehicle velocity. At the same time the orientation of the antenna system about the ground track constitutes an indication of direction and the two vital factors of speed and ground track are made known. From these data other desired data may be computed, such as present position of the vehicle, distance and direction to the destination and estimated time of arrival at the destination.

The exact nature of the invention will be more clearly understood from the following description taken together with the attached drawings, in which.

Figure 3:
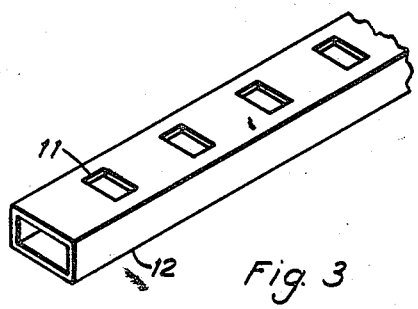
Figure 4:
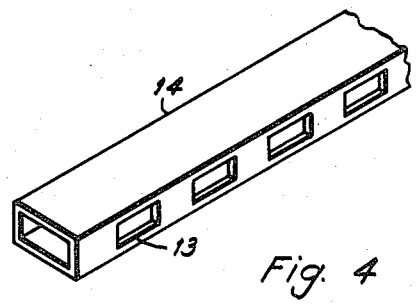
Figure 5:
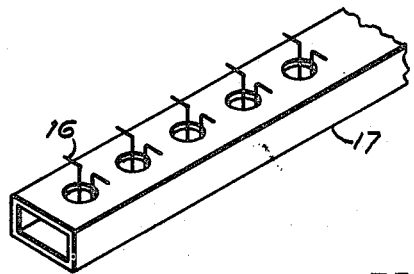

Figures 3–5, inclusive, are perspective views of portions of different types of antennas that may be advantageously used.

Figure 6:
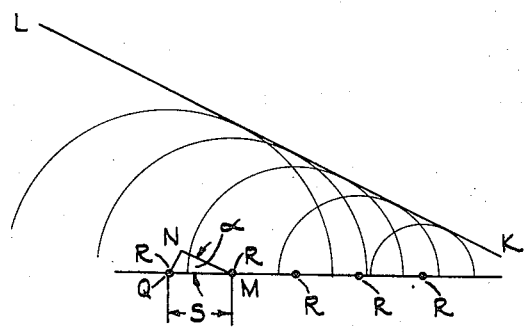

Figure 6 is a geometrical illustration aiding in the understanding of the operation of the antennas of Figs. 3, 4 and 5.

Figure 7:
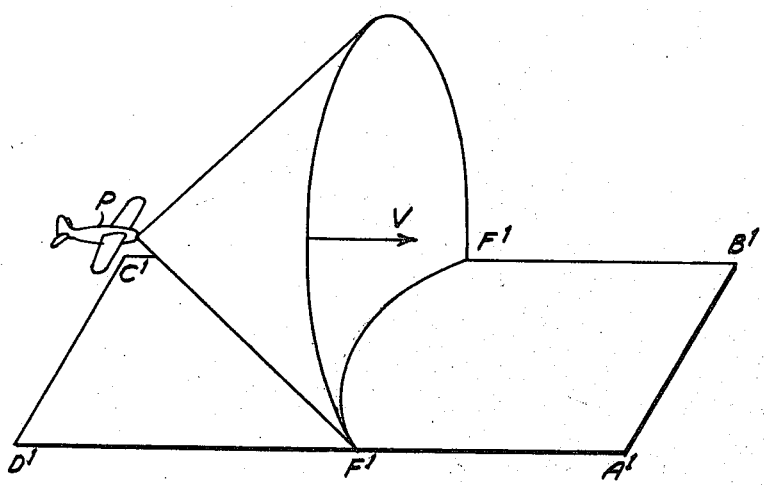

Figure 7 is a perspective view of the pattern of radiation and reception of the antennas of Figs. 3, 4 and 5.

Figure 8:
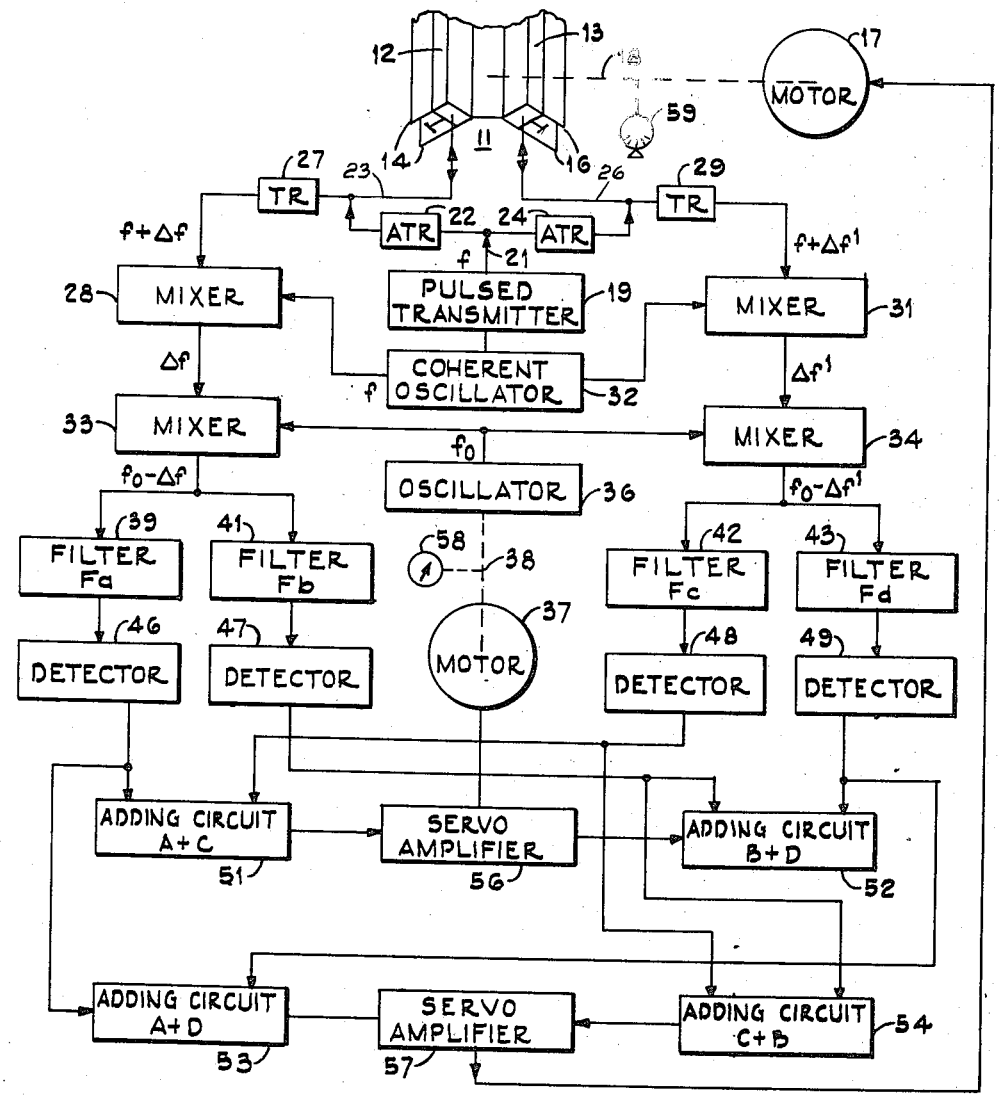

Figure 8 is a block diagram of one form of navigation system wherein electrical connections are generally illustrated by solid lines and mechanical connections by dotted lines.

Figure 9:
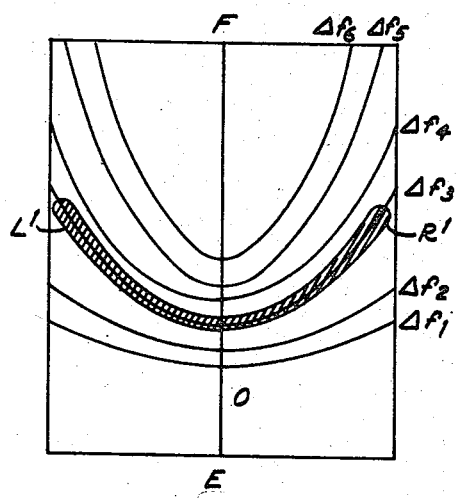

Figure 9 is a geometric illustration of the pattern of illuminated areas when the antenna assembly is aligned with the direction of motion.

Figures 10A to 10D, inclusive, are curves illustrating the band-pass characteristics of the filters used in the system of Fig. 8.

Figure 11:
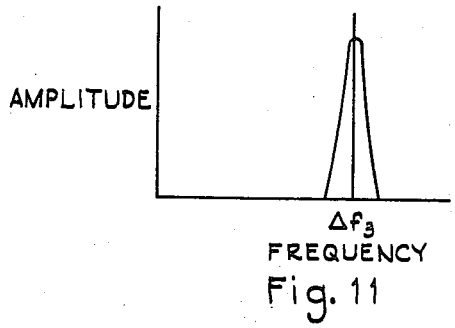
Figure 12:
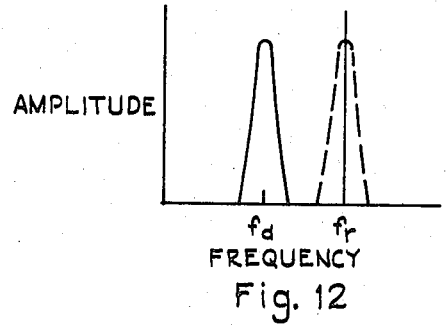

Figures 11 and 12 are curves illustrating the spectra of Doppler shift frequencies when the antenna assembly is aligned with the direction of travel.

Figure 13:
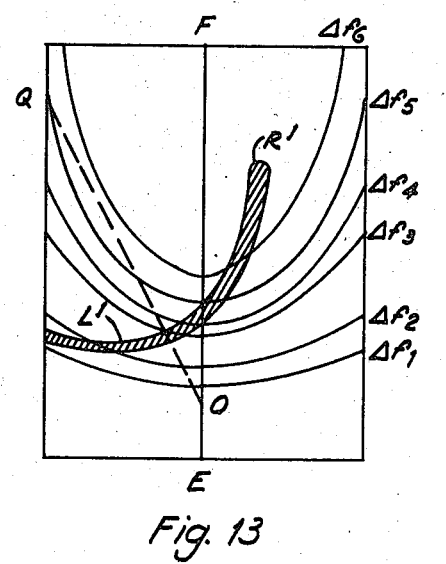

Figure 13 is a geometric illustration of the pattern of illuminated areas when the antenna assembly is not aligned with the direction of motion.

Figure 14:
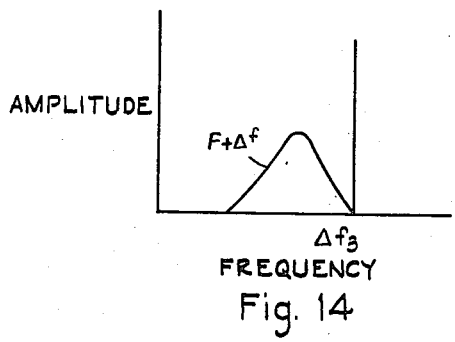
Figure 15:
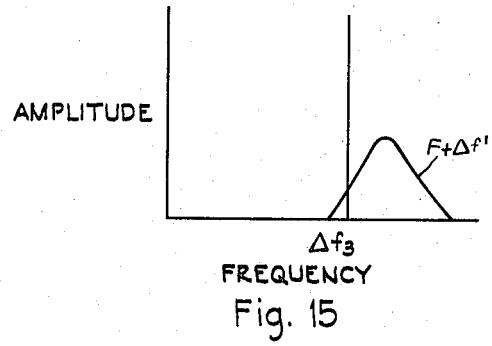
Figure 16:
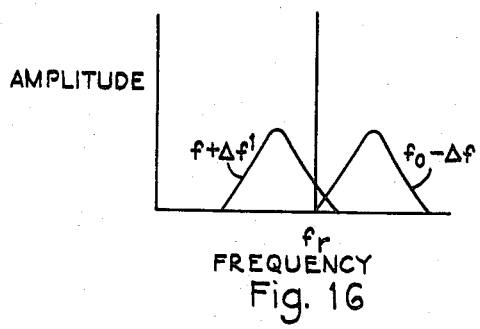

Figures 14, 15 and 16 are curves illustrating the spectra of Doppler shift frequencies when the antenna assembly is not aligned with the direction of motion.

Figure 17:
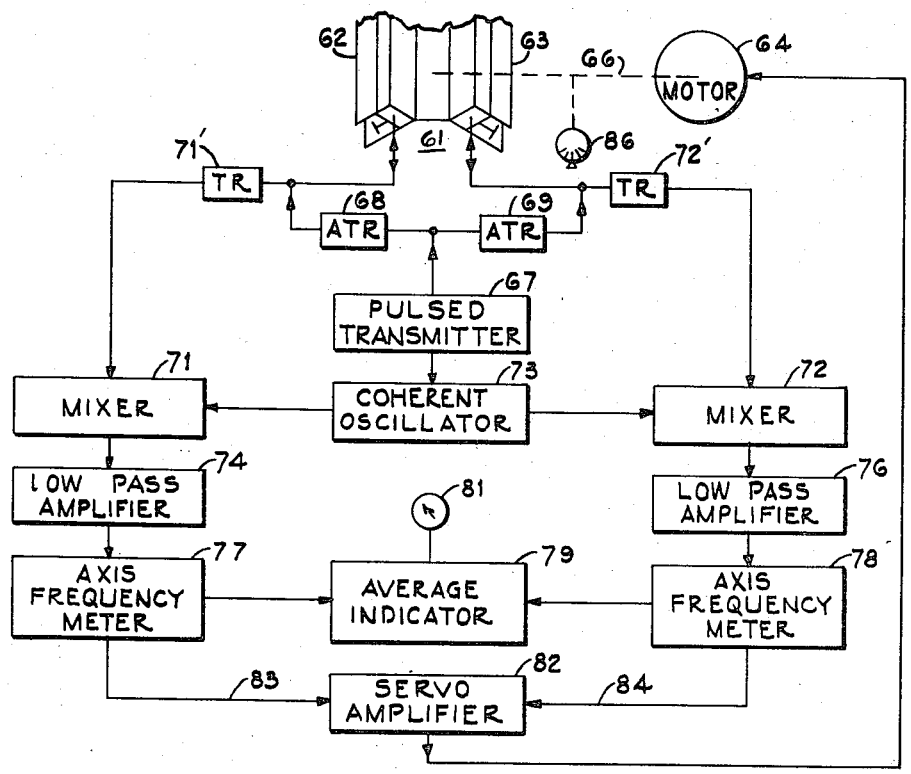

Figure 17 is a block diagram of a modified system of the invention.

Figure 18:
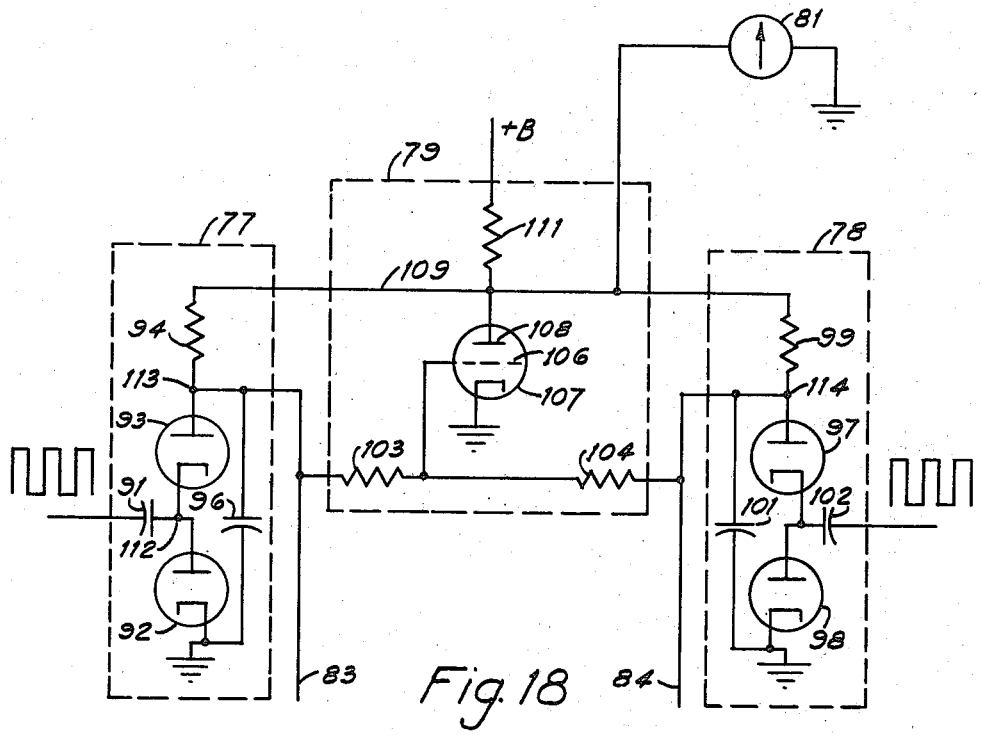

Figure 18 is a schematic diagram of a portion of the system of Fig. 17.

Figure 19:
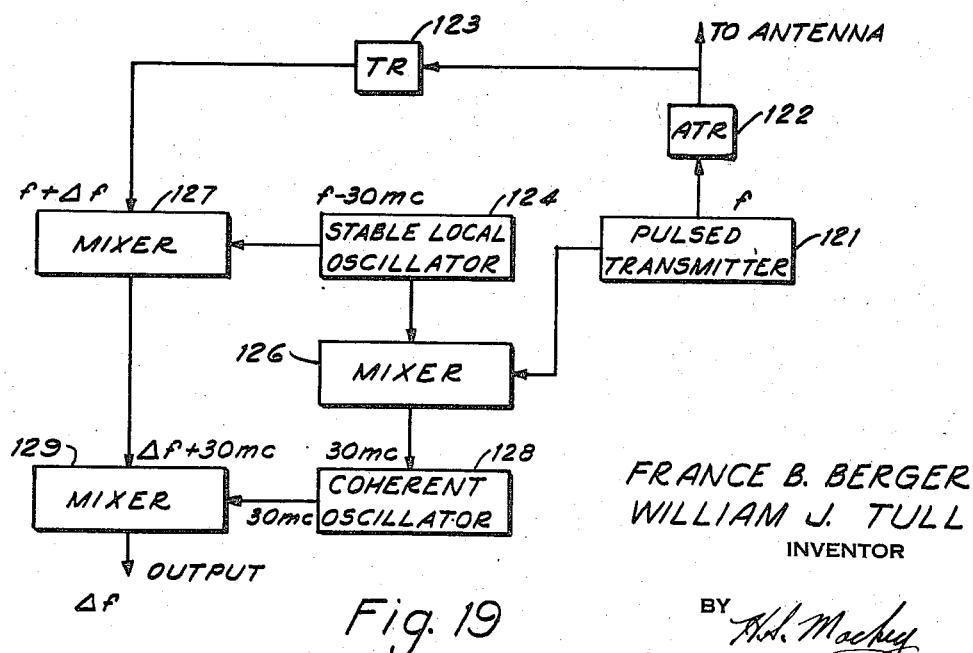

Figure 19 is a block diagram of a modified portion of the systems of Figs. 8 and 17.

As heretofore stated when signals are radiated from an airplane to the earth's surface, reflected thereby and received on the airplane, the frequency of the signals received will differ from the frequency of the signals transmitted by an amount expressed by the formula $$\Delta f = \frac{2fV \cos \theta}{C}$$

where $\Delta f$ is the change in frequency or Doppler shift, $f$ is the frequency of the transmitted signal, $V$ the speed of the airplane, $C$ the velocity of the waves transmitted through space and $\theta$ the angle between the velocity vector to be measured and the direction of propagation.

Figure 1:
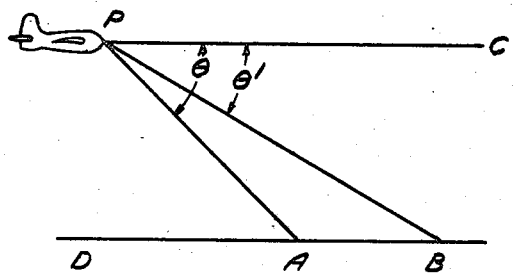
Figure 1 is a representation of the geometrical relationships involved when an airplane flying above the earth's surface transmits a signal and receives its reflection.

This relationship may be better visualized by reference to Fig. 1 where for purposes of explanation the horizontal velocity vector PC is considered as the velocity vector of interest. If a signal of known frequency is transmitted from the plane P to the point A on the earth's surface and reflected back therefrom so that the direction of propagation constitutes the line PA, the Doppler shift in frequency will depend on the component of the speed of the plane in the direction PC, i. e., it will be proportional to $\cos \theta$, $\theta$ being the angle between the velocity vector PC and the direction of propagation PA. If on the other hand a different direction of propagation is considered, as the line PB a different Doppler shift in frequency will be obtained for the same magnitude of the velocity vector PC since the new direction of propagation PB is at a different angle $\theta'$ with respect thereto.

Considering each point on the earth's surface as a radiator of reflected signals transmitted from the airplane it will be apparent that at any selected magnitude of the velocity vector, signals will be received thereby which differ in Doppler shift in frequency with different angles of propagation but which are constant in Doppler shift in frequency for all constant angles $\theta$.

For purposes of ease of description it will be assumed that it is desired to determine ground speed or the component of velocity in a horizontal plane although it will be apparent that other velocity components may be obtained as well. In that case, the angle $\theta$ taken as the angle between the horizontal velocity vector PC and the direction of propagation PA is kept constant despite climb or dive by any self-leveling arrangement of the antenna system.

Figure 2:
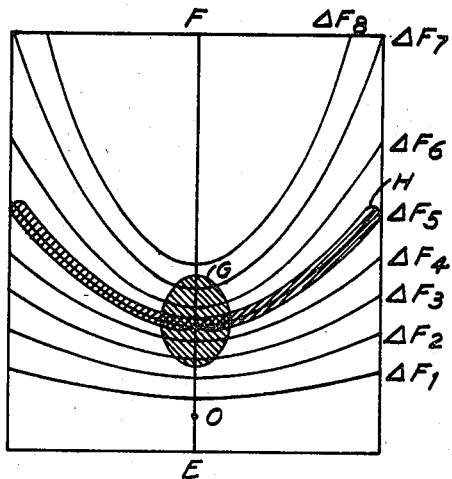
Figure 2 is a geometrical representation of the Doppler frequency patterns formed on the earth's surface.

If the line constituting the direction of propagation PA is rotated about the line PC at a constant angle $\theta$ with respect thereto, it will be clear that at every point of intersection of this line with the earth's surface, the same Doppler shift in frequency will be observed on the airplane at any one speed thereof. Rotation of the line PA in this manner generates a cone having an apex angle of $2\theta$ and the intersection of this cone with a plane surface, and the earth may be substantially so considered for the purposes of explanation, is a hyperbola. Contours of constant Doppler frequency shift may then be drawn on the earth's surface as a family of hyperbolas as illustrated in Fig. 2.

In this figure the point O is the point on the earth's surface directly beneath the airplane and the line EF is a projection on the earth's surface of the direction in which the airplane is traveling, not necessarily its heading since when a wind force is present the airplane will head at an angle to its true direction of travel, such angle being known as the drift angle. Under these conditions, lines drawn on the earth's surface connecting all those individual points from which the same Doppler shift in frequency is returned to the airplane will appear as hyperbolas $\Delta F_1$ to $\Delta F_8$ inclusive, the Doppler shift in frequency increasing as the subscript increases in numerical value, i. e., $\Delta F_1$ represents the contour of low Doppler frequency shift and $\Delta F_8$ the contour of high Doppler frequency shift, the other contour lines $\Delta F_2$ to $\Delta F_7$ being graded between these values.

If the returned signal could be obtained from one point or a small elemental area of the earth's surface, the Doppler shift in frequency as observed on the airplane would be confined to a single frequency or at the most a small band of frequencies the value of which could more easily be determined to determine the speed of the airplane.

This is not practical, however, as an extremely large antenna is required and when the signal is confined to a very small elemental area the difference in reflective properties of different ground areas results in wide fluctuations in signal strength which adversely affect operation.

If the area from which the signal is received, i. e., the "illuminated area" is made larger and takes in a spread of the frequency contour lines such as the cross-hatched area G illuminating an area covered by frequency contour lines $\Delta F_3$ to $\Delta F_7$ inclusive, the energy return is sufficiently constant but the band of Doppler shift frequencies is so wide as to require complicated gating circuits before any useful information may ordinarily be had. The area G is an area such as would ordinarily be illuminated by a paraboloid antenna.

On the other hand, if the area illuminated can be made to conform to an area of the shape indicated by the cross-hatched area H which follows closely a frequency contour line and is narrow in the direction of changing Doppler frequency shift, the energy will be received at the airplane, will have the desired constancy and at the same time will be of relatively narrow bandwidth permitting greater accuracy of operation with less complicated apparatus.

One important aspect of the present invention contemplates the use of an antenna or more accurately an antenna system which performs just such a function of illuminating an area which is narrow in a direction that would produce returns of different Doppler frequency shift and which is wide in a hyperbolic curved direction following a contour of constant Doppler frequency shift.

Such an antenna, which may be a linear array, an end fired antenna or polystyrene rods, may take a variety of structural forms some of which are illustrated in Figs. 3 to 5 inclusive. In general such an antenna consists of a series of radiating elements spaced regularly along a straight line segment and radiating with a fixed and regular phase relationship. Where for example, the radiation is in the microwave region the antenna may consist of a section of wave guide having radiating elements spaced regularly along one side.

Referring to Fig. 3, for example, the radiating elements may consist of slots 11 cut in the wide dimension of a wave guide section 12, the wave guide being appropriately dimensioned for the microwave length that it is expected to handle.

Likewise as illustrated in Fig. 4 the radiating elements may consist of slots 13 cut in the narrow dimension of a wave guide section 14. Additionally as illustrated in Fig. 5 the radiating elements may consist of dipoles 16 inserted in a wave guide section 17. In all cases the desired angle of radiation is achieved by selecting the proper dimensions of wave guide and the proper spacing of radiating elements compatible with the frequency of the energy employed as appears more fully hereinafter.

Consider now the action of the linear array in radiating and receiving signals with particular reference to Fig. 6. Each of the radiating elements, slots, dipoles or the like, indicated by points R radiate wavelets of energy and the wave front KL is defined by the envelope bounding these wavelets at equal phase points. Taking the line MN parallel to the line KL as a wavefront for analysis, it will be seen that the phase difference or phase change undergone by a wavelet in traveling from the point Q to the point N through the air will be:

$$\phi_{NQ} = 2\pi \frac{\overline{QN}}{\lambda} \qquad (2)$$

where $\overline{QN}$ is the distance from point Q to point N and $\lambda$ is the wavelength of the microwave energy in air. Where S is the distance between the radiating elements and $\alpha$ is the angle between lines QM and NM Equation 2 may be expressed as:

$$\phi_{NQ} = 2\pi S \frac{\sin \alpha}{\lambda} \qquad (3)$$

Likewise the phase difference or phase change of the microwave energy in traveling in the wave guide from point Q to point M is expressed as:

$$\phi_{QM} = 2\frac{\pi S}{\lambda_g} \qquad (4)$$

where S is the spacing of the radiating elements as before and $\lambda_g$ is the wavelength of the microwave energy in the wave guide, the relationship between $\lambda$ and $\lambda_g$ as is well known is $$\frac{\lambda}{\lambda_g} = \sqrt{1 - \left(\frac{\lambda}{2a}\right)^2} \qquad (5)$$

where $a$ is the guide width.

The condition that points M and N be in phase, that is, that the line MN be the wavefront is satisfied only when the phase change undergone by the wavelet traveling from Q to N is equal to the phase change undergone by the wavelet in traveling from Q to M or when the right hand sides of Equations 3 and 4 are equal to each other or differ by a multiple of $2\pi$, i. e.:

$$2\pi S \frac{\sin \alpha}{\lambda} = 2\frac{\pi S}{\lambda_g} \pm 2\pi n \qquad (6)$$

where $n$ is an integar and $2\pi n$, therefore, represents a phase displacement of 360° or a multiple thereof.

Rearranging Equation 6 there is obtained the expression:

$$\sin \alpha = \frac{\lambda}{\lambda_g} \pm \frac{n\lambda}{S} \qquad (7)$$

When $n$ is set as equal to zero the angle $\alpha$ at which the radiation leaves the antenna is called the zero order beam angle and if the constants $\lambda$, $\lambda_g$ and S are so chosen that for any other value of $n$, the expression $$\frac{\lambda}{\lambda_g} \pm \frac{n\lambda}{S}$$

is greater than 1, there can be but one angle $\alpha$ and hence there is only a zero order beam. For this determination it is sufficient to substitute for $n$ merely the values $+1$ and $-1$ since if $$\frac{\lambda}{\lambda_g} \pm \frac{n\lambda}{S}$$

is greater than 1 at these values of $n$ it necessarily follows that this expression is greater than 1 for all other values of $n$.

If this expression is not greater than 1 when values other than zero are substituted for $n$ radiation will leave the antenna in several directions corresponding to the possible values of $\alpha$ determined by Equation 7. For the purposes of the present invention it is desired that there be but the zero order beam so that but one angle of radiation is had and values of $\lambda$, $\lambda_g$ and S are selected to obtain this desideratum. When this requirement is attained it is apparent that the radiation from the antenna is confined to a surface which is the locus of lines making the angle $\alpha$ with the axis of the antenna and that this surface is a cone whose apex angle is $2\alpha$.

Referring to Fig. 7 there are illustrated the theoretical conditions which obtain when such an antenna is mounted on an airplane P, the axis of the antenna coinciding with the velocity vector V of the aircraft. It will be noted that the pattern of radiation formed by the intersection of the antenna pattern and the surface of the earth represented by the rectangle A', B', C', D' forms a hyperbola F'F' of the same configuration as the contours of constant frequency previously discussed. As a practical matter the radiation pattern of an antenna such as described herein, has some finite width so that the illuminated area on the earth's surface will actually be such as is illustrated by the area H of Fig. 2. Likewise the radiation will not be a complete cone as illustrated in Fig. 7 since the portion of the wave guide opposite the radiating elements will act as a shield confining the radiation to a section of a conical surface rather than a complete cone. This, however, is an advantage rather than a disadvantage and for the reasons as will appear more fully hereinafter, it is found advisable to restrict the conical section of radiation to an even greater degree by the addition of shields to the antenna.

Referring now to Fig. 8 there is illustrated by block diagram a system for obtaining the speed and true direction of travel or drift angle utilizing a pair of such directional antennas mounted on a single rotatable antenna assembly 11. Antenna 12 will be referred to as the left looking antenna and antenna 13 as the right looking antenna. Both these antennas have the same structure and may consist of sections of wave guide having spaced dipoles as radiating elements or alternatively they may be one of the other forms such as disclosed in Figs. 3 and 4.

In any event, these antennas are provided with shields 14 and 16 extending along their lengths to confine their pattern of radiation to more restricted sections of cones, a segment of 30° between half power points being found to be satisfactory. The antennas 12 and 13 are mounted on the assembly 11 at an angle so that the antenna 12 illuminates an area to the left and antenna 13 an area to the right of the axis of the assembly as indicated by the cross-hatched areas L' and R' of Fig. 9. The assembly 11 is mounted for rotation by the motor 17 through the action of a shaft 18 for purposes as will appear more fully hereinafter.

A pulsed transmitter 19 such as a magnetron or the like, supplies energy to be radiated by the antennas through a connection 21, ATR tube 22 and connection 23 to left looking antenna 12 and through connection 21 ATR tube 24 and connection 26 to right looking antenna 13. While single lines are illustrated as connections 21, 23 and 26 it will be appreciated by those skilled in the art that where as here contemplated, microwaves are involved such connections are composed of wave guide, coaxial cable or the like.

The left and right looking antennas 12 and 13 act not only to radiate the pulses generated by the transmitter 19 but also as means to receive the energy after it has been reflected from the earth's surface. The energy received by left looking antenna 12 is transmitted through connection 23 ta the TR tube 27 and thence to the mixer 28, while the energy received by right looking antenna 13 is transmitted through the TR tube 29 to the mixer 31. As is well understood in the radar art the combination of ATR (anti-transmit-receive) and TR (transmit-receive) tubes or switches act to disconnect the receiving apparatus from the antenna during the transmitted pulse but to connect the pulsed transmitter thereto and to disconnect the pulsed transmitter from the antenna and connect the receiver thereto when echoes are being received. The manner in which these tubes or switches operate and the physical forms which they may take are set forth in Radar System Engineering by Ridenour, Radiation Laboratory Series, volume 1 at pages 407 to 411 inclusive and further discussion thereof is unnecessary.

The signal received by the left looking antenna 12 which will have a frequency $f+\Delta f$ if the antenna is directed in a generally forward direction, $f$ being the transmitted frequency and $\Delta f$ the Doppler shift in frequency, is mixed in a mixer 28 with a signal generated by the coherent oscillator 32.

In this present instance the coherent oscillator 32 generates a continuous signal of the same frequency $f$ as the transmitted signal and it is necessary to provide such an oscillator in order that a signal shall be available for comparison purposes at the time the reflected signal or echo is received. The pulsed transmitter 19 transmits oscillator pulses of short time duration with comparatively long periods of no signal between pulses. When an echo pulse is received, therefore, the transmitter 19 is not operating and is not available as a signal source to provide a signal which may be mixed with the received signal. The coherent oscillator 32 continuously generating signals of the same frequency as the frequency of oscillations of the transmitted pulses acts to supply the comparison signal which is otherwise lacking. Merely to operate the coherent oscillator 32 at the same frequency as the oscillations of the transmitted pulses, however, is not sufficient in and of itself to insure the derivation of useful information from the received signals. The signals generated by the coherent oscillator 32 must also have the same relative phase as the oscillations of the transmitted pulses, in other words they must be coherent.

More specifically, each reflected pulse or echo must be compared with a signal to derive the Doppler shift or beat difference frequency, and this beat difference frequency amplitude is a function of the phase difference at the start of the two signals. The phase at the start of the reflected or echo pulse, however, is a function of the phase at the start of the transmitted pulse which generated it in the first instance. Therefore, the phase of the reference signal must also be a related function of the same transmitted pulse initial phase, in order that successive beat difference pulse amplitudes shall define a beat frequency.

Generators of microwave pulses, however, are random in phase, that is to say, any particular pulse may start at any point in the microwave cycle so that the phase at the start of any transmitted microwave pulse may vary from pulse to pulse. If the oscillator 32 were operated at a continuous constant phase the requirement that the phase of the echo pulse and the phase of the comparison signal be related would not obtain.

The phase of the continuous signal generated by the coherent oscillator must therefore be changed as each pulse is generated by the transmitter 19 so that when the reflected or echo pulse is received there will be a signal available not only of the proper frequency but also of the proper phase. To this end a portion of the energy generated by the transmitter 19 is fed to the coherent oscillator which may be of the construction and controlled in the manner as described in the copending application Serial No. 786,174, filed November 15, 1947, of Emmett S. Watson.

The reflected or echo signal received by right looking antenna 13 is transmitted to a mixer 31 where this signal is also mixed with the signal generated by the coherent oscillator 32 to obtain a difference beat frequency. The echo signal received by the right looking antenna 13 may be expressed by the term $f+\Delta f'$ where $f$ is the frequency of the transmitted signal as before and $\Delta f'$ is the Doppler shift in frequency which is received by antenna 13 and which is not necessarily the same Doppler shift in frequency, $\Delta f$, as received by antenna 12.

Because a difference beat frequency is obtained in mixers 28 and 31 and their inputs are respectively signals having frequencies $f+\Delta f$, $f$, $f+\Delta f'$ and $f$, the outputs obtained therefrom are $\Delta f$ and $\Delta f'$ respectively. These signals are respectively transmitted to mixers 33 and 34 where the signal having the frequency $\Delta f$ or $\Delta f'$ as the case may be is mixed with a signal of the frequency $f_0$ generated by an oscillator 36 in each case a difference frequency being obtained and the frequency $f_0$ generated by the oscillator 36 being higher than the expected Doppler shift in frequencies so that the output of mixer 33 constitutes a signal having the frequency $f_0-\Delta f$ while that of mixer 34 constitutes a signal having the frequency $f_0-\Delta f'$.

The oscillator 36 is operated by a motor 37 through the medium of a shaft 38 and may be of any desired construction such that the frequency $f_0$ generated thereby is a function of the speed of the motor 37.

A portion of the output of mixer 33 is fed to a filter 39 while another portion of the output is fed to a filter 41. Similarly the output of mixer 34 is applied to two separate filter circuits 42 and 43. The filters 39, 41, 42 and 43 have band-pass characteristics as illustrated in Figs. 10A to 10D inclusive.

Filter 39 passes frequencies $F_a$ which are lower than a fixed reference frequency $f_r$ and rejects all other frequencies while filter 41 passes frequencies $F_b$ which are higher than the fixed frequency $f_r$ and rejects all other frequencies. Similarly filter 42 passes frequencies $F_c$ which are lower than the reference frequency $f_r$ rejecting all others and filter 43 passes frequencies $F_d$ which are higher than the reference frequency $f_r$ rejecting all other frequencies.

The output of each of the filters 39, 41, 42 and 43 is fed to a separate detector 46, 47, 48 and 49 which rectifies the signal passed by the respective filter to which it is connected, producing a direct current output proportional to the signal passed by the respective filters, if any signal is so passed.

Four adding circuits 51, 52, 53 and 54 are connected to the outputs of the detectors 46, 47, 48 and 49 which add the direct current outputs thereof in different combinations of two's. Adding circuit 51 has as its input, the outputs of detectors 46 and 48 and hence its output constitutes the sum of the direct current outputs of these detectors. Adding circuit 52 has as its input, the outputs of detectors 47 and 49 and its output is the sum of the direct current outputs of these detectors. Adding circuit 53 has as its input the outputs of detectors 46 and 49 and its output is the sum of the direct current outputs of these detectors. Finally adding circuit 54 has as its input the outputs of detectors 47 and 48 so that its output is the sum of the outputs of these detectors.

The outputs obtained from the adding circuits 51 and 52 are differentially applied to the input circuit of a servo amplifier 56, the difference in these outputs constituting the error signal for the servo amplifier which error signal operates through the servo amplifier to control the speed of the motor 37 in accordance with the value thereof in a manner described hereinafter.

The outputs of adding circuits 53 and 54 are differentially applied to the input of a servo amplifier 57, the difference thereof constituting an error signal which acts through the servo amplifier 57 to control the direction and amount of rotation of the motor 17 in accordance with the sense and amount of such error signal.

The mode of operation of the system of Fig. 8 is as follows:

Assume first that the axis of the antenna assembly 11 is pointed in the direction of true travel of the aircraft. In such an instance the pattern illuminated by the left looking antenna 12 and the pattern illuminated by the right looking antenna 13 will coincide with one of the lines of constant Doppler frequency contour $\Delta f_3$ (see Fig. 9). The pattern or area illuminated by these antennas has some finite width in the direction of travel of the aircraft so that the returned echo signal will consist not of a single frequency but of a band of frequencies which, however, since the area illuminated by the antenna is narrow in a direction intercepting different lines of constant frequency contour, will be a narrow band of frequencies as illustrated in Fig. 11.

Both the right and left looking antennas illuminate areas which are symmetrical around the line of constant frequency contour $\Delta f_3$ so that the band of frequencies received by each antenna will be the same, having a maximum amplitude at a frequency $\Delta f$ dropping off sharply on either side thereof. The band of frequencies received by these antennas of course, constitutes the frequency of the transmitted pulses $f$ plus the Doppler shift in frequencies $\Delta f$ which as illustrated by Fig. 11 is not a single frequency but a finite band thereof.

The signal returned by reflection from the areas L' and R' having a frequency $f + \Delta f$ is received by antennas 12 and 13 and transmitted to the respective mixers 28 and 31 where the echo signal is mixed with a signal of the frequency $f$ derived from the coherent oscillator 32. The mixers may also include a low pass amplifier so that the output thereof constitutes only the difference frequency of the signals impressed thereon, that is, a signal having the frequency $\Delta f$, the band of Doppler shift in frequencies.

These difference signals are in turn transmitted through respective circuits to mixers 33 and 34 where they are mixed with a signal of a frequency $f_0$ derived from the oscillator 36. Again mixers 33 and 34 may also contain low pass amplifier portions so that the outputs thereof are only the difference frequencies $f_0 - \Delta f$.

Figure 10:
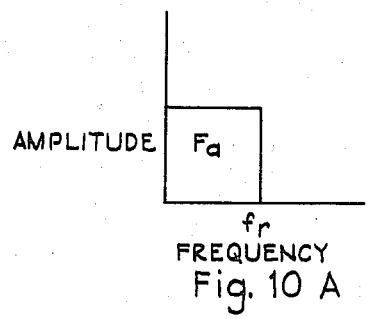
Figure 10:
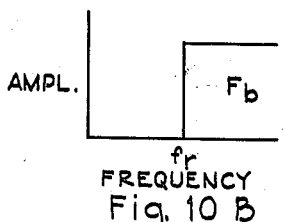
Figure 10:
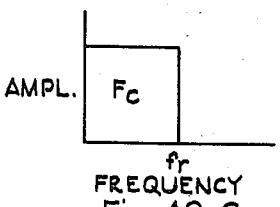
Figure 10:
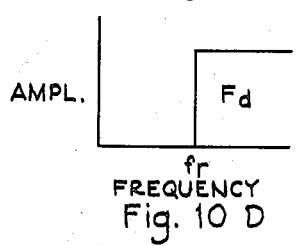

The output of mixer 33 is transmitted to two filters 39 and 41 which have the respective band pass characteristics as illustrated in Fig. 10A and 10B and the output of mixer 34 is transmitted to two filters 42 and 43 having characteristics as respectively illustrated in Figs. 10C and 10D.

It will be apparent that if the signal having a band of frequencies $f_0 - \Delta f$ is such that the mid-point of the band constitutes the frequency $f_r$, the reference cutoff frequency of all of the filters 39, 41, 42 and 43 then each filter will pass the same amount of energy. The energy output of each filter is fed to a separate rectifier 46, 47, 48 or 49 as the case may be and this energy converted to a direct current proportional thereto. The outputs of detectors 46 and 48 are combined in an adding circuit 51 the output of which constitutes one part of the differential input to the servo amplifier 56, while the outputs of detectors 47 and 49 are combined in an adding circuit 52 whose output forms the other part of the input to the servo amplifier 56. In the case assumed that is, where $f_0 - \Delta f$ is such that the mid-point of the band represented thereby equals the frequency $f_r$, the sum of the outputs of detectors 46 and 48 equals that of detectors 47 and 49 and no error signal is impressed on the servo amplifier, and the motor 37 runs at a constant speed which in turn through the shaft 38 maintains the oscillator at a constant signal frequency $f_0$.

Assume now, however, that the aircraft changes its speed so that the Doppler shift frequency band is centered about a new frequency higher than that previously received on the right and left looking antennas. The speed of the motor 37 and hence the frequency of the signal generated by the oscillator 36 will momentarily be the same as that just considered and therefore the band of frequencies impressed on the filters 39, 41, 42 and 43, namely, $f_0 - \Delta f$ will be centered around a lower frequency $f_d$ as indicated in Fig. 12, this new frequency $f_d$ being less than the frequency $f_r$ which is the cutoff or crossover frequency of all of the filters 39, 41, 42 and 43.

As indicated in Figs. 10A to 10D inclusive, filters 39 and 42 will pass this band of frequencies but filters 41 and 43 will not. There will be then a direct current output obtained from detectors 46 and 48 connected to the respective outputs of filters 39 and 42 but no output will be obtained from detectors 47 and 49 connected to the respective outputs of filters 41 and 43. Current is therefore present in the output of adding circuit 51 in proportion to the output of detectors 46 and 48, in the instance assumed a maximum, while the current present in the output of the adding circuit 52 will be the sum of the outputs of detectors 47 and 49 or in the instance assumed, zero. The input of the servo amplifier 56 which is the difference of the outputs of adding circuits 51 and 52 will, therefore constitute a large error signal which is in a sense such as to increase the speed of the motor 37. Increase in speed of motor 37, however, acting through shaft 38 increases the frequency of the signal $f_0$ generated by the oscillator. This in turn acting through mixers 33 and 34 causes the band of frequencies $f_0 - \Delta f$ to increase in the scale of frequencies until this band is again centered around the frequency $f_r$ as illustrated by the dotted curve of Fig. 12 when, as before described, the outputs of adding circuits 51 and 52 are equal and there is no error signal to control the motor speed. The motor 37, therefore, runs at the new speed now established such that the frequency $f_0$ generated by the oscillator minus the Doppler shift in frequency $\Delta f$ has an average equal to the constant frequency $f_r$ established by the characteristics of the filters 39, 41, 42 and 43.

The oscillator 36, mixers 33 and 34, their associated filters and detectors, adding circuits 51 and 52 and servo amplifier 56 constitute a feedback circuit which at all times causes the motor 37 to rotate at a speed substantially proportional to the average Doppler frequency shift. The speed of the vehicle may, therefore, be indicated by a tachometer 58 connected to the shaft 38. Throughout these operations the input of the servo amplifier 57 which is the difference of the outputs of the adding circuits 53 and 54, remains balanced and is unaffected by speed changes since the output of detectors 46 and 48 are compared rather than added in the operation of servo 57.

For an understanding of the mode of operation of the system in determining the true direction of travel of the aircraft or its drift angle, let it now be assumed that the antenna system is not pointed in the direction of travel of the vehicle. In such a case the areas illuminated by the left and right looking antennas will not follow the constant frequency contours but will cross the lines of constant frequency contours in the manner illustrated in Fig. 13.

In Fig. 13 the aircraft is assumed to be directly over the point O traveling in a direction E—F so that the constant frequency contours are as before $\Delta f_1 - \Delta f_6$ inclusive. The axis of the antenna assembly, however, is directed along a line O—Q either because the aircraft is heading in that direction due to wind, because the antenna assembly is momentarily not aligned with the direction of travel or both. In any event, and whatever the cause the illuminated areas L' and R' are not coincident with the lines of constant frequency contour but each intersects a number of such lines.

From a consideration of the geometry of Fig. 13 it will be apparent that the band of frequencies received by the left looking antenna 12 will be broader than that depicted by the curve of Fig. 11 since the illuminated area L' covers and intersects a number of different lines of constant frequency. Additionally the same consideration indicates that this band of frequencies is of a lower frequency than that indicated by the curve of Fig. 11 since the area covered is in the zone of the lower constant frequency contours. This relationship is graphically illustrated by the curve of Fig. 14 wherein the line $\Delta f_3$ represents the same frequency as indicated by a similar line in Fig. 11 and where the received spectrum of frequencies is indicated by a broadened curve occupying a portion of the frequency scale below the frequency $\Delta f_3$.

A similar analysis as respects the area R' illuminated by the right looking antenna indicates that a frequency curve such as illustrated in Fig. 15 is received. That is to say, the received wave is broadened in its spectrum and a major portion of the spectrum received is higher in frequency than the frequency $\Delta f_3$.

The echo signal received by the left looking antenna 12, then will be a frequency spectrum $f+\Delta f$ as illustrated in Fig. 14, while the echo signal received by the right looking antenna 13 will be a frequency spectrum $f+\Delta f'$ as illustrated in Fig. 15.

These signals are transmitted through separate channels to mixers 28 and 31 producing outputs having a frequency spectrum $\Delta f$ and $\Delta f'$ in the manner heretofore described and in turn transmitted to mixers 33 and 34 where the respective signals are mixed with a signal of the frequency $f_0$ generated by the oscillator 36. These mixers may also incorporate low band pass filtered so that only the difference frequencies are transmitted thereby.

The outputs of mixers 33 and 34, $f_0-\Delta f$ and $f_0-\Delta f'$, are in turn transmitted to the filters 39, 41, 42 and 43 as hereinbefore described. The outputs of these filter circuits are rectified by the detectors 46, 47, 48 and 49 and the direct current obtained thereby corresponding to the amount of signal passed by the respective filters is applied to adding circuits 53 and 54. The inputs of adding circuit 53 consists of the outputs of detectors 46 and 49 which in turn correspond to the amount of signal passed by filters 39 and 43, while the inputs of adding circuit 54 consist of the outputs of detectors 47 and 48 corresponding to the amount of signal passed by filters 41 and 42.

Because the spectrum $\Delta f$ received by the left looking antenna is lower in frequency than the spectrum $\Delta f'$ received by the right looking antenna, the spectrum $f_0-\Delta f$ impressed on filters 39 and 41 will be higher in frequencies than the spectrum $f_0-\Delta f'$ impressed on filters 42 and 43. As heretofore described, however, the oscillator 36 is made to operate so that the frequency $f_0$ generated thereby is proportional to the average of the Doppler shift in frequencies. This means that the spectrum $f_0-\Delta f$ lies above the frequency $f_r$, i. e., the cutoff of filters 39, 41, 42 and 43 and the spectrum $f_0-\Delta f'$ lies below this frequency. This is graphically illustrated in Fig. 16 wherein the spectrum $f_0-\Delta f'$ is almost wholly below the frequency $f_r$ while the spectrum $f_0-\Delta f$ is almost wholly above this frequency. Filters 39 and 42 pass signals having frequencies lower than $f_r$ rejecting all others, while filters 41 and 43 pass signals having frequencies higher than $f_r$ rejecting all others. Since the spectrum $f_0-\Delta f'$ is generally lower in frequency than frequency $f_r$ and is impressed on filters 42 and 43 and only filter 42 passes the low frequencies, most of the output derived from the right looking antenna branch will be impressed on the adding circuit 54 through the detector 48. At the same time since the spectrum $f_0-\Delta f$ is generally higher in frequency than the frequency $f_r$ most of the output derived from the left looking antenna branch will be passed through only filter 41 and will be likewise impressed on the adding circuit 54 through the detector 47. Very little signal on the other hand will be impressed on the adding circuit 53 since very little signal is passed by filters 39 and 43.

The output of adding circuit 54 will therefore be large as compared with that of adding circuit 53 and these outputs are differentially impressed on the servo amplifier 57 in such fashion that when the output of adding circuit 54 predominates the antenna assembly 11 is rotated clockwise by the motor 17 and conversely the antenna assembly is rotated counterclockwise when the output of adding circuit 53 predominates.

Under the assumption heretofore made, the antenna assembly 11 is rotated in a clockwise direction by reason of the different frequency spectra received by the right and left looking antennas. Such rotation, however, moves the illuminated areas L' and R' in such a direction as to cause them to approach coincidence with the lines of constant frequency contour and hence to move the spectrum of frequencies received by left looking antenna up in the scale of frequency and the spectrum received by the right looking antenna down in the scale. This action continues until the antennas are aligned symmetrically about the true direction of travel as indicated by the illustration of Fig. 9. When such alignment has been accomplished the spectra of frequencies received by both antennas will be as illustrated in Fig. 11 and under these conditions the energy passed by filters 46 and 49 will equal that passed by filters 47 and 48 so that the outputs of adding circuits 53 and 54 will be equal, no error signal is impressed on the servo amplifier and the motor 17 is stopped, thereby maintaining the antenna assembly aligned with the true direction of travel regardless of the heading of the aircraft.

By connecting an indicator 59 to the shaft 18 the amount of rotation of the antenna assembly with respect to the heading of the aircraft may be registered and hence the drift angle and true direction of travel determined.

In Fig. 17 there is disclosed a modified system for obtaining true speed and direction of travel utilizing the same antenna arrangement.

Referring to this figure an antenna system consisting of a left looking linear array antenna 62 and a right looking linear array antenna 63 are mounted on an assembly 61 so that both antennas may be rotated by a motor 64 through the medium of a shaft 66.

The left and right looking antennas are connected to a pulsed transmitter 67 through respective ATR tubes 68 and 69 so that each antenna transmits pulses of a frequency $f$. These pulses after being transmitted and reflected from the earth's surface are received by the same antennas and the echo signals so received transmitted to separate receiving branches through the respective TR tubes 71' and 72', the ATR and TR combination acting to isolate the transmitted and received signals in the manner heretofore described. The reflected or echo signal differs from the transmitted signal by the Doppler shift in frequency and hence the received signal has a frequency $f+\Delta f$, $\Delta f$ being the Doppler shift in frequency. The signals so received are mixed in mixers 71 and 72 with a signal of the frequency $f$ generated by a coherent oscillator 73 operated in the same manner as the coherent oscillator 32 of the system of Fig. 8.

From the mixers 71 and 72 the difference signal of the received signal and that generated by the coherent oscillator 73 is fed through respective low pass amplifiers 74 and 76 to the inputs of axis frequency meters 77 and 78. These meters, the operation of which will be described presently, convert the signal of the frequency $\Delta f$ impressed on their inputs to a direct current voltage whose value is proportional to the frequency of the input signal.

The values of these voltages are averaged in an average indicator 79 and the average indicated by a meter 81 which may be calibrated in terms of speed to indicate the true speed of the vehicle. Additionally, the voltage outputs of the axis frequency meters 77 and 78 are differentially impressed on the input of a servo amplifier 82 through respective conductors 83 and 84, the difference signal acting as an error signal which through operation of the servo amplifier 82 controls the amount and direction of rotation of the motor 64, which in turn positions the antenna assembly 61 so that it is directed in accordance with the true direction of travel of the vehicle in the same manner as previously described in connection with the system of Fig. 8.

An indicator 86 attached to the shaft 66 connecting the motor and antenna assembly indicates the true direction of travel or drift angle of the same manner as the indicator 59 of the Fig. 8 system.

Turning now to the illustration of Fig. 18 there is therein disclosed a circuit diagram of the axis frequency meters 77 and 78 and the average indicator 79 generally disclosed as rectangles in Fig. 17.

The signal which constitutes the spectrum of Doppler frequency shift is converted to a square wave of constant amplitude by any well known clipping means and is introduced through a condenser 91 to the junction of two diodes 92 and 93. The diodes are connected in series between ground and a source of positive potential, the series circuit including in addition to the diodes a resistance 94. Across the diodes there is also connected a condenser 96 which is relatively large as compared to the condenser 91.

The axis frequency meter 78 indicated by the dotted rectangle having the same reference character comprises a similar circuit consisting of diodes 97 and 98 connected a resistance 99. The diodes are shunted by a condenser 101 which is relatively large as compared with the condenser 102 through which the Doppler shift in frequency derived from the right looking antenna is impressed on the frequency meter circuit.

The anodes of diodes 93 and 97 are connected through high resistances 103 and 104 to the grid 106 of an amplifier 107 which although illustrated as a triode may be a pentode or any other suitable tube which has a high gain. The anode 108 of the amplifier 107 is connected to a common conductor 109 connecting resistances 94 and 99 and to the source of positive potential through a limiting resistance 111. The voltmeter 81 is connected between ground and the common conductor 109.

For an understanding of the operation of this circuit let it be assumed that the square wave alternating voltage impressed on the axis meter 77 has an amplitude of the value E. When by reason of the impression of this voltage on the circuit through the condenser 91 the junction 112 of the diodes 92 and 93 is made instantaneously positive the charge on condenser 91 flows through diode 92 to ground. On the other hand on the next half cycle when the junction point 112 is made negative the charge on condenser 96 flows through diode 93 neutralizing the charge of condenser 91 and the amount of charge in condenser 96 will equal the capacity thereof multiplied by the potential impressed thereon. In other words $$Q = C(E - E') \quad (8)$$

where Q is the charge, C the capacity of condenser 96, E the amplitude of the impressed wave and E' the potential of point 113. These pulses of charge, which are smoothed out by the large capacity of condenser 96 cause a current $i$ to flow through resistance 94 and diode 93 which is equal to the coulombs of energy per second accumulated in and discharged by condenser 96. That is to say, $$i = fQ \quad (9)$$

where $f$ is the frequency of the signal impressed on the axis frequency meter 77.

Substituting the value of Q obtained from Equation 8 in Equation 9, the expression $$i = fC(E - E') \quad (10)$$

is obtained.

Considering the voltage of the conductor 109 as $E_f$ it will be apparent that this voltage is equal to the voltage of terminal 113 plus the potential drop in resistance 94, or $$E_f = E' + Ri \quad (11)$$

where R is the resistance of the resistance 94.

Substituting the values obtained in Equation 10 in Equation 11, the expression $$E_f = E' + fRC(E - E') \quad (12)$$

is derived.

The values R and C are constant and the value E is also made constant by clipping so that if the value E' also be made constant the voltage $E_f$ will vary only as the frequency $f$ and therefore constitutes a measure thereof.

This is accomplished by connecting the grid 106 of a high gain amplifier 107 to the point 113 through a high resistance 103 while the anode 108 thereof is connected to the upper terminal of resistance 94 and lower terminal of resistance 111 thus providing a negative feedback circuit which to all intents and purposes maintains the terminal 113 at a constant potential.

Thus far the action of only the axis frequency meter 77 has been considered. The meter 78, however, operates in a similar manner and since its terminal 114 is likewise connected to the grid 106 through a resistance 104 and a similar feedback circuit is provided, it is the average of the potentials of junctures 113 and 114 which is kept constant when different frequency spectra are impressed on the meters 77 and 78 as will be the case when the antenna system is not aligned with the true direction of travel as graphically illustrated in Fig. 13. Under such circumstances the voltage of terminal 113 will be greater than that of the terminal 114 and this difference may be impressed on the input of the servo amplifier 82 (see Fig. 17) through conductors 83 and 84 to produce an error signal which will rotate the motor 64 and antenna assembly 61 until proper alignment and hence no error signal is obtained. At this time the potentials of terminals 113 and 114 will be the same since both right and left looking antennas are receiving signals having the same Doppler shift in frequency.

Even when there is misalignment of the antenna assembly, however, the potential of conductor 109 will constitute a value equal to the average of the frequencies received since the potential drop in resistance 94 will be less than that in resistance 99 in proportion to the different frequency signals impressed on the inputs of meters 77 and 78 and this average will constitute a measure of the speed at which the vehicle is traveling. Correct alignment of the antenna assembly, however, by action of the servo 82 and motor 64 since it results in the parallel receiving systems each receiving a very narrow band or spectrum of the same frequencies removes any ambiguities due to the right and left looking antennas receiving spectra of different widths and characteristics and therefore results in a more accurate reading being indicated on the motor 81.

In describing the systems of Figs. 8 and 17 the coherent oscillators therein used were operated at carrier frequency, that is, they generated continuous waves of the same frequency as the frequency of the transmitted pulses.

It is obvious, however, that such oscillators may be operated at some lower intermediate frequency and it is sometimes more feasible to so operate them. In Fig. 19 there is illustrated a portion of a system using such an arrangement which may be substituted into either of the systems of Figs. 8 or 17.

A pulsed transmitter 121 is connected to an antenna through an ATR tube 122 and the reflected or echo signal is transmitted to the receiving system through a TR tube 123. Rather than phasing the coherent oscillator directly from the pulsed transmitter as in Figs. 8 and 17, a portion of the signal generated thereby is mixed with a portion of the signal generated by a stable local oscillator 124 in a mixer 126 and the difference frequency obtained from the mixer output used to phase a coherent oscillator 128 operating at a lower frequency. For example, where the frequency generated by the pulsed transmitter is $f$ the frequency of the stable oscillator may be $f - 30$ mc. so that the difference frequency and that at which the coherent oscillator is operated is 30 mc.

A portion of the signal generated by the stable oscillator 124 is also mixed with the received signal in a mixer 127 producing a difference frequency of $\Delta f + 30$ mc., assuming that the received signal is $f + \Delta f$. The output of the mixer 127 is in turned mixed with the 30 mc. signal generated by the coherent oscillator 128 in a mixer 129, the difference signal obtained thereby constituting the Doppler shift in frequencies Δf.

While the stable oscillator 124 must be quite stable in frequency it is not necessary that it be coherent in phase with the phase of the pulsed transmitter since its output is mixed with the received signal and with the transmitted signal to control the phase of the coherent oscillator, the output of which is in turn mixed with the resultant of the received signal and the signal generated by the stable oscillator so that the effect of any phase difference between the stable oscillator and the pulsed transmitter is canceled out.

While for the purposes of explanation systems utilizing pulsed transmission have been illustrated and described it will be obvious to those skilled in the art that continuous wave transmission may be utilized with equal efficacy.

Those skilled in the art will readily appreciate that where desired amplifiers may be inserted to increase the energy output of the various mixers, filters, detectors and the like. These well known and usual instrumentalities have been omitted from the illustrations, however, for the purposes of simplicity and clarity since they are old per se and their inclusion would add nothing to the understanding of the inventive concepts here described.

What is claimed is:

1. A navigation system adapted to be mounted on a vehicle for navigating the vehicle relative to the earth's surface comprising, linear antenna array means producing a conical beam of radiation, means for so mounting said antenna array means on said vehicle that the axis of said conical beam is in a plane which is substantially parallel to the axis of said vehicle, the directivity pattern of said conical beam illuminating the earth's surface over a hyperbolic area which is wide in the direction along the hyperbolic curve and narrow in a direction normal thereto, means on said vehicle for radiating microwave energy from said vehicle towards the earth's surface for reflection thereby, means including said antenna array means for receiving said reflected signal, and means for determining the frequency difference between the energy radiated from said vehicle and said reflected signal to indicate the speed of said vehicle.

2. A navigation system adapted to be mounted on a vehicle for navigating the vehicle relative to the earth's surface comprising, first and second linear antenna array means each producing a conical beam of radiation, means for so mounting said antenna array means on said vehicle that the axes of said conical beams are in a plane which is substantially parallel to the axis of the vehicle, the directivity patterns of said antenna array means illuminating the earth's surface in selected distinct portions of a hyperbolic area which is wide in the direction along the hyperbolic curve and narrow in a direction normal thereto, means for radiating microwave energy from said vehicle toward the earth, means including said first and second antenna array means for simultaneously receiving signals reflected from different areas on the earth's surface, means for comparing the spectra of microwave signal frequencies received by said first and second antennae array means and obtaining a difference frequency therefrom, and means responsive to said difference frequency for controlling the orientation of said antenna array means relative to the ground track of the vehicle.

3. A navigation system comprising, an antenna assembly mounted on a vehicle moving relative to the earth's surface, said antenna assembly including a pair of elongated members rigidly connected together with their longitudinal axes in substantially parallel relationship, each of said elongated members being provided with means for radiating microwave energy along their length and for phase retarding the microwave traveling therethrough, shielding means for each of said elongated members whereby the patterns of radiation produced thereby constitute separate portions of conical surfaces, rotatable mounting means for said antenna assembly, pulsed microwave transmitting means including said antenna assembly on said vehicle for transmitting a pulsed microwave signal to the earth's surface for reflection thereby, means including said elongated members for receiving the reflected microwave signal, means for rotating said antenna assembly and means operative by the difference in frequency of the reflected signals received by said separate elongated members for controlling said rotating means whereby said antenna assembly is aligned with the direction of travel of said vehicle.

4. A navigation system according to claim 3 having means for determining the shift in frequency undergone by the signal in being transmitted, reflected and received for indicating the speed of the vehicle.

5. A navigation system comprising a first linear array antenna, a second linear array antenna, said first and second antennas being mounted on a common antenna assembly with their longitudinal axes in substantially parallel relationship, means including shielding means for each of said antennas for confining their radiation patterns to portions at opposite sides of the longitudinal axis of the antenna assembly, means for rotatably mounting said antenna assembly on a vehicle, pulsed microwave transmitting means on said vehicle for transmitting pulsed microwave signals to the earth's surface for reflection thereby, receiving means including said first antenna for receiving certain reflected pulsed microwave signals, receiving means including said second antenna for receiving other of said reflected pulsed microwave signals, means for rotating said antenna assembly and means operative by a comparison of the frequencies of the reflected signals received by said first and second mentioned receiving means for controlling said means for rotating said antenna assembly whereby the axis of said antenna assembly is aligned with the true direction of travel of said vehicle.

6. A navigation system according to claim 5 in which said first and second linear array antennas constitute means for radiating the transmitted signal as well as receptors for the reflected signals.

7. A navigation system according to claim 6 having means for comparing the frequency of the transmitted signal with the frequency of the reflected signals to determine the true speed of the vehicle.

8. A navigation system for a vehicle comprising a pulsed microwave transmitter carried thereby, means for radiating said pulsed microwave signals for reflection by the earth's surface, a first antenna for receiving the reflected signals from one direction, a second antenna for receiving the reflected signals from another direction, an antenna assembly on which said first and second antennas are rigidly mounted, means for rotating said antenna assembly with respect to said vehicle on which it is carried, an oscillator for generating continuous wave signals, means including said pulsed transmitter for rephasing the signals generated by said continuous wave oscillator as a function of the phase of each generated pulse signal in timed relation with the transmission of each successive pulse signal, means for mixing the signal generated by said continuous wave oscillator with a signal having a frequency proportional to the frequency of the signal received by said first antenna to obtain a first difference frequency, means for mixing the signal generated by said continuous wave oscillator with a signal having a frequency proportional to the frequency received by said second antenna to obtain a second difference frequency, means for deriving a first electrical quantity having an amplitude proportional to said first difference frequency, means for deriving a second electrical quantity having an amplitude proportional to said second difference frequency, and means responsive to said first and second electrical quantities for controlling said means for rotating said antenna assembly in such a direction and to such an extent that the axis of said antenna assembly is aligned with the direction of travel of said vehicle.

9. A navigation system according to claim 8 having additional means responsive to said first and second electrical quantities for indicating the speed of said vehicle.

10. A navigation system according to claim 9 in which said first and second antennas comprise elongated members each of which is provided with means for radiating microwave energy along its length and for phase retarding the microwave energy traveling therethrough.

11. A navigation system according to claim 10 in which said means for radiating said pulsed microwave signals for reflection by the earth's surface includes said first and second antennas.

12. A navigation system for a vehicle comprising a pulsed microwave transmitter carried thereby, means for radiating said pulsed microwave signals for reflection by the earth's surface, a first antenna for receiving the reflected signals from one direction, a second antenna for receiving the reflected signals from another direction, an antenna assembly on which said first and second antennas are rigidly mounted, means for rotating said antenna assembly with respect to said vehicle on which it is carried, an oscillator for generating continuous wave signals whose frequency is a function of the frequency of transmitted pulse signals, means including said pulse transmitter for rephasing the signals generated by said continuous wave oscillator as a function of the phase of each generated pulse signal in timed relation with the transmission of each successive pulse signal, means for mixing the signal generated by said continuous wave oscillator with a signal having a frequency proportional to the frequency of the signal received by said first antenna to obtain a first difference frequency spectrum corresponding to the Doppler shift in frequencies, means for mixing the signal generated by said continuous wave oscillator with a signal having a frequency proportional to the frequency received by said second antenna to obtain a second difference frequency spectrum corresponding to the Doppler shift in frequencies, an oscillator generating a continuous wave signal variable in frequency, means for mixing said variable frequency signal with said first difference frequency spectrum for obtaining a third frequency spectrum, means for mixing said variable frequency signal with said second difference frequency spectrum for obtaining a fourth frequency spectrum, first and second filters connected to have said third frequency spectrum impressed thereon, said first filter passing only signals whose frequency is lower than a selected frequency and said second filter passing only signals whose frequency is higher than said selected frequency, third and fourth filters connected to have said fourth frequency spectrum impressed thereon, said third filter passing only signals whose frequency is lower than said selected frequency and said fourth filter passing only signals whose frequency is higher than said selected frequency, means responsive to the comparison of the signal energy passed by said first and third filters and the signal energy passed by said second and fourth filters for determining the frequency of the signal generated by said variable frequency oscillator and means operative by said last named means for determining the speed of said vehicle.

13. A navigation system in accordance with claim 12 having means responsive to the comparison of the signal energy passed by said first and fourth filters and the signal energy passed by said second and third filters for controlling said means for rotating said antenna assembly in such direction and to such an extent that the axis of said antenna assembly is aligned with the direction of travel of said vehicle and means for indicating said direction.

14. A navigation system according to claim 13 in which said first and second antennas comprise elongated members each of which is provided with means for radiating microwave energy along its length and for phase retarding the microwave energy traveling therethrough.

15. A navigation system for a vehicle comprising a pulsed microwave transmitter carried thereby, means for radiating said pulsed microwave signals for reflection by the earth's surface, a first antenna for receiving the reflected signals from one direction, a second antenna receiving the reflected signals from another direction, an antenna assembly on which said first and second antennas are rigidly mounted, a motor operatively connected to said antenna assembly to rotate said assembly with respect to said vehicle on which it is carried, an oscillator for generating continuous wave signals whose frequency is a function of the frequency of the transmitted pulse signals, means including said pulsed transmitter for rephasing the signals generated by said continuous wave oscillator as a function of the phase of each generated pulse signal in timed relation with the transmission of each successive pulse signal, a first mixer connected to said continuous wave oscillator and to said first antenna circuit producing a first difference frequency spectrum corresponding to the Doppler shift in frequencies, a second mixer connected to said continuous wave oscillator and to said second antenna circuit producing a second difference frequency spectrum corresponding to the Doppler shift in frequencies, an oscillator generating a continuous wave signal variable in frequency, a motor operatively connected to said oscillator controlling by its speed of rotation the frequency of the signal generated thereby, a third mixer connected to said variable frequency oscillator and to said first mixer producing a third difference frequency spectrum, a fourth mixer connected to said variable frequency oscillator and to said second mixer producing a fourth difference frequency spectrum, first and second filters connected to have impressed thereon the output of said third mixer, said first filter passing only signals whose frequency is lower than a selected frequency and said second filter passing only signals whose frequency is higher than said selected frequency, third and fourth filters connected to have impressed thereon the output of said fourth mixer, said third filter passing only signals whose frequency is lower than said selected frequency and said fourth filter passing only signals whose frequency is higher than said selected frequency, first, second, third and fourth rectifiers connected respectively to the outputs of the first, second third and fourth filters, a first adding circuit connected to combine the outputs of the first and third rectifiers, a second adding circuit connected to combine the outputs of the second and fourth rectifiers, a servo amplifier whose input comprises an error signal constituted by the difference of the outputs of said first and second adding circuits, the output of said servo amplifier being connected to operate said second mentioned motor whereby the motor is rotated at such a speed that the frequency of the signal generated by the variable frequency oscillator which it controls has a value as to produce a substantially zero error signal input for said servo amplifier, and speed indicating means connected to said second mentioned motor shaft.

16. A navigation system in accordance with claim 15 having a third adding circuit connected to combine the outputs of said first and fourth rectifiers, a fourth adding circuit connected to combine the outputs of said second and third rectifiers, a second servo amplifier whose input comprises an error signal constituted by the difference of the outputs of said third and fourth adding circuits, the output of said last mentioned amplifier being connected to said first mentioned motor whereby the motor is rotated in such direction and to such an extent that substantially zero error signal is applied to said second servo amplifier and the axis of said first antenna assembly is aligned with the direction of travel of said vehicle, and an indicator connected to the shaft of said first mentioned motor to indicate said direction.

17. A navigation system in accordance with claim 16 in which said first and second antennas comprise elongated members each of which is provided with means for radiating microwave energy along its length and for phase retarding the microwave energy traveling therethrough.

18. A navigation system for a vehicle comprising a pulsed microwave transmitter carried thereby, means for radiating said pulsed microwave signals for reflection by the earth's surface, a first antenna for receiving the reflected signals from one direction, a second antenna for receiving the reflected signals from another direction, an antenna assembly on which said first and second antennas are rigidly mounted, means for rotating said antenna assembly with respect to said vehicle on which it is carried, an oscillator generating continuous wave signals whose frequency is a function of the frequency of the transmitted pulse signals, means including said pulse transmitter for rephasing the signals generated by said continuous wave oscillator as a function of the phase of each generated pulse signal in timed relation with the transmission of each successive pulse signal, a first mixer connected to said continuous wave oscillator and to a circuit including said first antenna producing a difference frequency spectrum corresponding to the Doppler shift in frequencies received thereby, a second mixer connected to said continuous wave oscillator and to a circuit including said second antenna producing a difference frequency spectrum corresponding to the Doppler shift in frequencies received thereby, means connected to said first mixer for producing a first direct current quantity whose amplitude is proportional to the frequency of the signal output thereof, means connected to said second mixer for producing a second direct current quantity whose amplitude is proportional to the frequency of the signal output thereof, a servo amplifier whose input comprises an error signal constituted by the difference of said first and second direct current quantities, the output of said servo amplifier being electrically connected to said means for rotating said antenna assembly whereby said assembly is rotated in such direction and to such extent that the axis thereof is aligned with the true direction of travel, and means connected to means for rotating said assembly to indicate the angle of rotation thereof.

19. A navigation system for a vehicle comprising a pulsed microwave transmitter carried thereby, means for radiating said pulsed microwave signals for reflection by the earth's surface, a first antenna for receiving the signals reflected from one direction, a second antenna for receiving the signals reflected from another direction, an antenna assembly on which said first and second antennas are mounted in fixed relation to each other, means for rotating said antenna assembly with respect to said vehicle on which it is carried, an oscillator generating continuous wave signals whose frequency is a function of the frequency of the transmitted pulse signals, means including said pulse transmitter for rephasing the signals generated by said continuous wave oscillator as a function of the phase of each generated pulse signal in timed relation with the transmission of each successive pulse signal, a first mixer connected to said continuous wave oscillator and to a circuit including said first antenna producing a difference frequency spectrum corresponding to the Doppler shift in frequencies received thereby, a second mixer connected to said continuous wave oscillator and to a circuit including said second antenna producing a difference frequency spectrum corresponding to the Doppler shift in frequencies received thereby, means connected to said first mixer for producing a first direct current quantity whose amplitude is proportional to the frequency of the signal output thereof, means connected to said second mixer for producing a second direct current quantity whose amplitude is proportional to the frequency of the signal output thereof, means for obtaining an average of said direct current quantities and means for indicating said average for determining the speed of the vehicle.

20. A navigation system according to claim 19 including a servo amplifier whose input comprises an error signal constituted by the difference of said first and second direct current quantities, a circuit connecting the output of said servo amplifier to said means for rotating said antenna assembly whereby said assembly is rotated in such direction and to such extent that the axis thereof is aligned with the true direction of travel, and means connected to said means for rotating said antenna assembly to indicate the angle of rotation thereof.

21. A navigation system according to claim 20 in which said first and second antennas comprise elongated members each of which is provided with means for radiating microwave energy along its length and for phase retarding the microwave energy traveling therethrough.

References Cited in the file of this patent

UNITED STATES PATENTS

| Number | Name | Date |
|---|---|---|
| 2,223,224 | Newhouse | Nov. 26, 1940 |
| 2,423,023 | Hershberger | June 24, 1947 |
| 2,426,228 | Mackta | Aug. 26, 1947 |
| 2,427,029 | Stearns | Sept. 29, 1947 |
| 2,435,615 | Varian | Feb. 10, 1948 |
| 2,435,988 | Varian | Feb. 17, 1948 |
| 2,459,074 | Hastings-Hodgkins | Jan. 11, 1949 |
| 2,464,258 | Prichard | Mar. 15, 1949 |
| 2,468,751 | Hansen | May 3, 1949 |
| 2,482,162 | Feldmans | Sept. 20, 1949 |
| 2,489,288 | Hansen | Nov. 29, 1949 |

OTHER REFERENCES

"Tele-Tech," p. 47, published April 1947.